United States Patent
Beyabani

(10) Patent No.: US 8,266,660 B2
(45) Date of Patent: Sep. 11, 2012

(54) PORTAL FOR FUTURE EPISODE INFORMATION

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 466 days.

(21) Appl. No.: 12/205,097

(22) Filed: Sep. 5, 2008

(65) Prior Publication Data

US 2010/0064313 A1 Mar. 11, 2010

(51) Int. Cl.
*H04N 7/173* (2011.01)

(52) U.S. Cl. ............. 725/93; 725/46; 725/116; 709/219

(58) Field of Classification Search ............ 725/87–118, 725/37–61; 709/217–231
See application file for complete search history.

(56) References Cited

U.S. PATENT DOCUMENTS

| | | | | |
|---|---|---|---|---|
| 5,805,763 A * | 9/1998 | Lawler et al. | ................. | 386/296 |
| 5,860,862 A * | 1/1999 | Junkin | ............... | 463/40 |
| 5,978,381 A * | 11/1999 | Perlman et al. | ................ | 370/432 |
| 6,177,931 B1 * | 1/2001 | Alexander et al. | .............. | 725/52 |
| 6,637,032 B1 * | 10/2003 | Feinleib | .................. | 725/110 |
| 7,263,711 B1 * | 8/2007 | Estipona | .................. | 725/110 |
| 7,506,356 B2 * | 3/2009 | Gupta et al. | .................. | 725/116 |
| 2002/0154892 A1 * | 10/2002 | Hoshen et al. | ................. | 386/87 |
| 2004/0117831 A1 * | 6/2004 | Ellis et al. | .................. | 725/53 |

* cited by examiner

*Primary Examiner* — Annan Shang

(57) ABSTRACT

A device receives, from a set-top box (STB) and/or a user device, usage information associated with video content, and determines a content portal for a particular video content based on the received usage information. The device also provides, to the STB and/or the user device, the content portal for display, and receives, from the STB and/or the user device, selection of an option associated with the content portal. The device further provides information associated with the selected option to the STB and/or the user device for display and/or storage.

25 Claims, 14 Drawing Sheets

PORTAL FOR FUTURE EPISODE INFORMATION

BACKGROUND

Many television viewers like to know upcoming plot details for their favorite television shows (or programs), especially when a current episode ends. Several television shows provide (e.g., at the end of a current episode) a brief trailer that shows scenes for the following week's episode. However, other than these brief trailers, television viewers are left with little upcoming plot details for their favorite shows when a current episode ends.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a content portal (e.g., a window, a screen, etc.) that includes information associated with an upcoming episode of video content (e.g., a television series, a soap opera, a television show, etc.). The content portal may include, for example, an episode name, episode show time(s), episode information (e.g., plot details), an episode preview, recording option(s), related content (e.g., an Internet home page (e.g., a web site) for the video content, merchandise associated with the video content, etc.), etc. In one implementation, for example, the systems and/or methods may receive, from a set-top box (STB) and/or a user device, usage information associated with video content, and may determine a content portal for a particular video content based on the received usage information. The systems and/or methods may provide the content portal to the STB and/or the user device for display, and may receive, from the STB and/or the user device, selection of an option associated with the content portal. The systems and/or methods may provide the information associated with the selected option to the STB and/or the user device for display and/or storage.

As used herein, the terms "subscriber," "viewer," and/or "user" may be used interchangeably. Also, the terms "subscriber," "viewer," and/or "user" are intended to be broadly interpreted to include a user device, a STB, and/or a television or a user of a user device, STB, and/or television.

Figure 1:
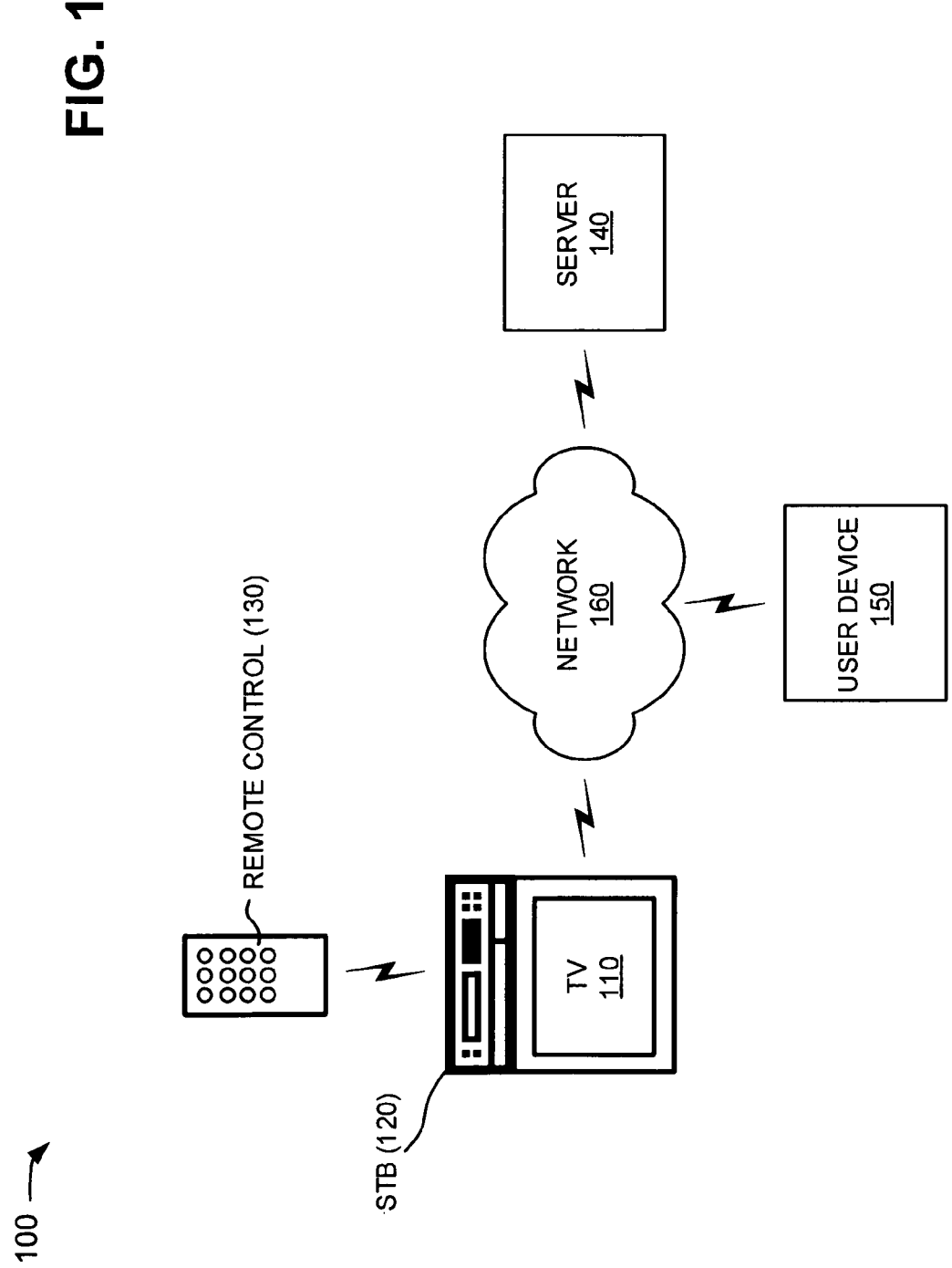
FIG. 1 depicts a diagram of an exemplary network in which systems and methods described herein may be implemented.

FIG. 1 is a diagram of an exemplary network 100 in which systems and methods described herein may be implemented. As illustrated, network 100 may include a television (TV) 110, a STB 120, a remote control 130, a server 140, and a user device 150 interconnected by a network 160. Components of network 100 may interconnect via wired and/or wireless connections. A single television 110, STB 120, remote control 130, server 140, user device 150, and network 160 have been illustrated in FIG. 1 for simplicity. In practice, there may be more televisions 110, STBs 120, remote controls 130, servers 140, user devices 150, and/or networks 160. Also, in some instances, one or more of the components of network 100 may perform one or more functions described as being performed by another one or more of the components of network 100.

Television 110 may include a television monitor that is capable of displaying television programming, content provided by STB 120, and/or content provided by other devices (e.g., a digital video disk (DVD) player, a video camera, etc., not shown) connected to television 110.

STB 120 may include a device that receives television programming (e.g., from server 140), and provides the television programming to television 110 or another device. STB 120 may allow a user to alter the programming provided to television 110 based on a signal (e.g., a channel up or channel down signal) from remote control 130. STB 120 may record video in a digital format to a disk drive or other memory medium within STB 120. In one exemplary implementation, STB 120 may be incorporated directly within television 110 and/or may include a digital video recorder (DVR).

Remote control 130 may include a device that allows a user to control programming and/or content displayed on television 110 via interaction with television and/or STB 120.

Server 140 may include one or more server entities, or other types of computation or communication devices, that gather, process, search, and/or provide information in a manner described herein. In one implementation, server 140 may include a computer system, an application, a cable head-end, and/or a broadcasting device capable of providing content (e.g., TV shows, TV programming, movies, on-demand services, live television, etc.), advertisements, instructions, and/or other information to STB 120 and/or user device 150.

User device 150 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, or other types of computation or communication devices, threads or processes running on these devices, and/or objects executable by these devices. In one implementation, user device 150 may include any device (e.g., an Internet Protocol (IP)-based device) that is capable of accessing server 140 via network 160.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
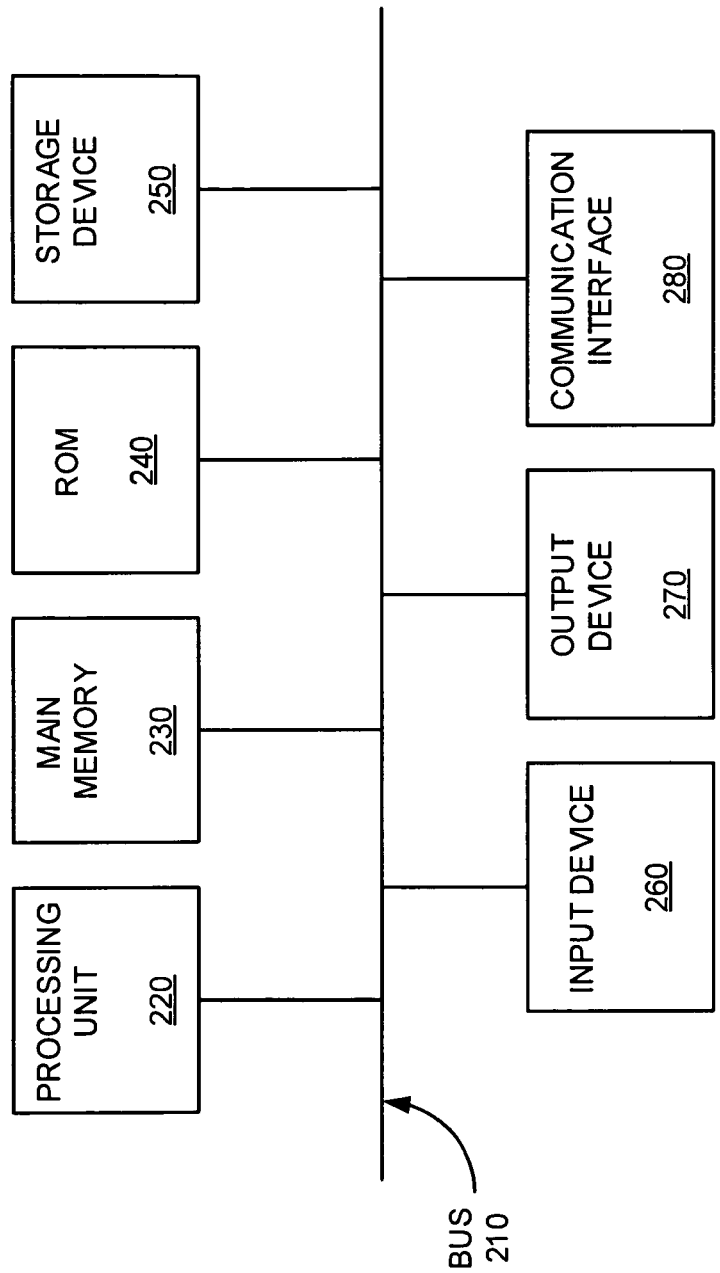
FIG. 2 illustrates exemplary components of a set-top box (STB), a server, and/or a user device of the network depicted in FIG. 1.

FIG. 2 is an exemplary diagram of a device 200 that may correspond to any of STB 120, server 140, and/or user device 150. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, microprocessor, or other type of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
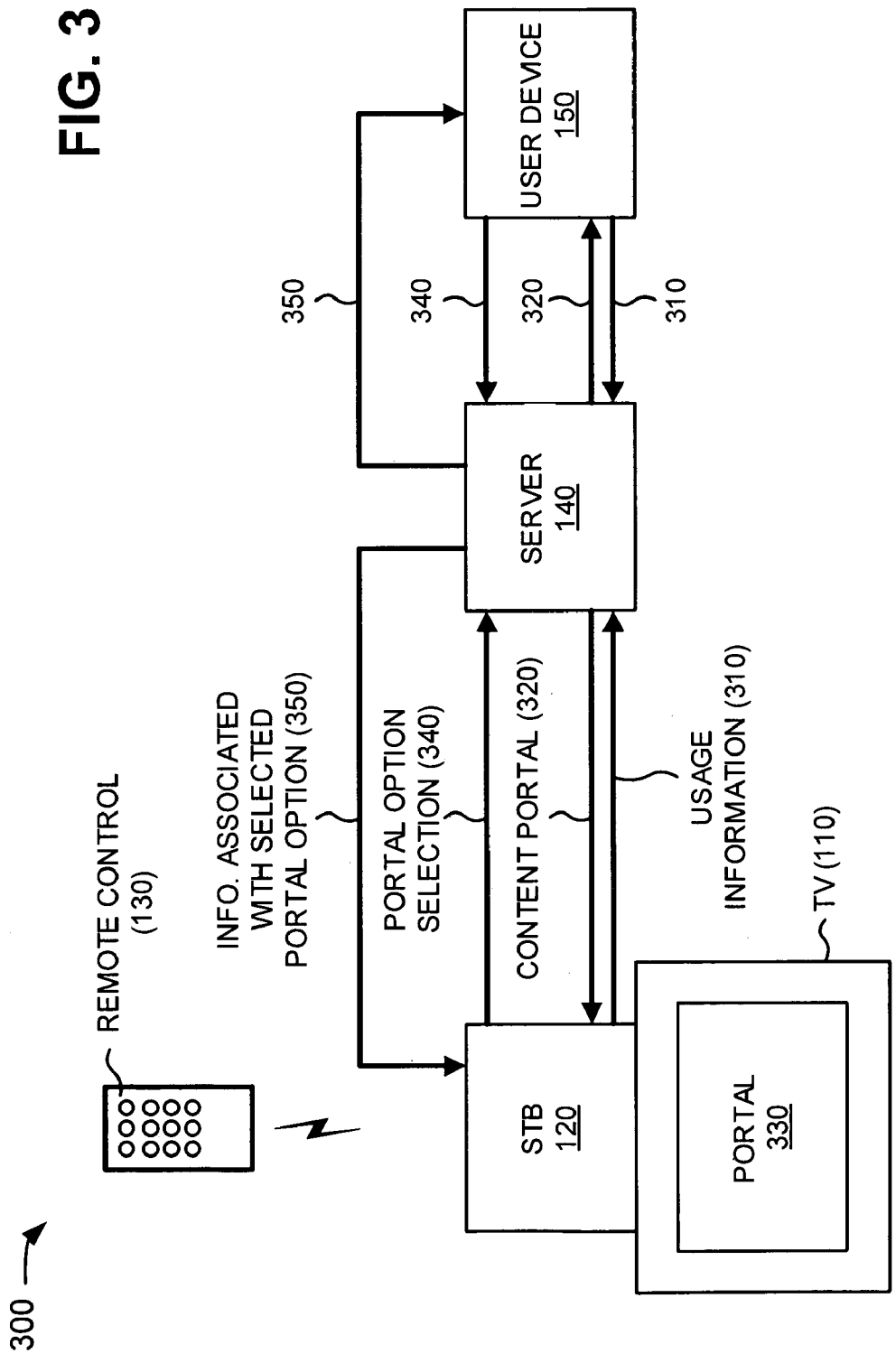
FIG. 3 depicts a diagram of an exemplary portion of the network illustrated in FIG. 1.

FIG. 3 depicts a diagram of an exemplary portion 300 of network 100. As illustrated, exemplary network portion 300 may include television 110, STB 120, remote control 130, server 140, and user device 150. Television 110, STB 120, remote control 130, server 140, and user device 150 may include the features described above in connection with, for example, FIG. 1.

As further shown in FIG. 3, server 140 may receive (e.g., from STB 120 and/or user device 150) usage information 310. Usage information 310 may include information associated with usage of services (e.g., provided by server 140) by a user of STB 120 and/or user device 150. For example, usage information 310 may include a user's favorite television show(s), a user's most-watched television show(s), identification information (e.g., a serial number, an account number, etc.) associated with the user's STB 120 and/or user device 150, a user's name, user demographic information (e.g., race, age, income, disabilities, educational attainment, home ownership, employment status, location, etc.), user-requested content portal(s) (e.g., a user may request a content portal for one or more shows and/or categories of shows), etc.

Server 140 may use usage information 310 to determine a content portal 320 to provide to STB 120 and/or user device 150 for display (e.g., via television 110 and/or user device 150). For example, in one implementation, server 140 may determine content portal 320 for a user's favorite show based on usage information 310 (e.g., based on a user-defined favorite show, based on a favorite show determined based on the user's viewing habits, etc.), and may provide such a content portal 320 to STB 120 and/or user device 150. Alternatively and/or additionally, server 140 may determine content portal 320 for a user's most-watched show based on usage information 310 (e.g., based on a user-defined most-watched show, based on a most-watched show determined based on the user's viewing habits, etc.), and may provide such a content portal 320 to STB 120 and/or user device 150. Alternatively and/or additionally, server 140 may determine content portal 320 based on a user-requested portal provided by usage information 310 (e.g., a user may request a content portal for one or more shows and/or categories of shows).

Content portal 320 may include a window, a menu, a drop-down menu, and/or other similar menu presentation mechanisms. Content portal 320 may provide information associated with a show (e.g., an episode of a show) that may be a user's favorite show (or one of the user's favorite shows), the user's most-watched show (or one of the user's most-watched shows), etc. For example, content portal 320 may include a name of a future episode of the show, one or more show times associated with the future episode of the show, information (e.g., a description, a story line, a plot, etc.) associated with the future episode of the show, a preview (e.g., a video clip, a trailer, etc.) associated with the future episode of the show, one or more recording options associated with the future episode of the show, related content (e.g., an Internet home page, merchandise, etc.) associated with the show, etc.

In one implementation, server 140 may provide content portal 320 to STB 120 and/or user device 150 when an episode of a show (e.g., a user's favorite show, the user's most-watched show) is complete. In another implementation, server 140 may provide the user (e.g., associated with STB 120 and/or user device 150) with an option to receive content portal 320 when the episode of the show is complete. In still other implementations, server 140 may provide content portal 320 (or an option to receive content portal 320) to STB 120 and/or user device 150 at any time (e.g., when the show is airing). For example, server 140 may provide content portal 320 (or an option to receive content portal 320) to STB 120 and/or user device 150 when the user is viewing an electronic program guide (EPG), an interactive program guide (IPG), an electronic service guide (ESG), etc.

As further shown in FIG. 3, server 140 may broadcast content portal 320 on television 110, via STB 120, and/or on user device 150. For example, STB 120 may receive content portal 320 from server 140, and may display a portal 330 (e.g., a window, a menu, etc.) on television 110. In another example, user device 150 may receive content portal 320 from server 140, and may display portal 330 on a display device associated with user device 150. Portal 330 may include information associated with a show (e.g., an episode of a show) that may be a user's favorite show (or one of the user's favorite shows), the user's most-watched show (or one of the user's most-watched shows), etc. For example, portal 330 may include a name of a future episode of the show, one or more show times associated with the future episode of the show, information (e.g., a description, a story line, a plot, etc.) associated with the future episode of the show, a preview (e.g., a video clip, a trailer, etc.) associated with the future episode of the show, one or more recording options associated with the future episode of the show, related content (e.g., an Internet home page, merchandise, etc.) associated with the future episode of the show, etc.

If a user (or viewer) of television 110 selects one of the options associated with portal 330 (e.g., via remote control 130), STB 120 may provide an associated portal option selection 340 to server 140. Alternatively and/or additionally, user device 150 may provide portal option selection 340 to server 140. In one implementation, portal option selection 340 may include selection of one or more of a name of a future episode of a show, one or more show times associated with the future episode of the show, information associated with the future episode of the show, a preview associated with the future episode of the show, one or more recording options associated with the future episode of the show, related content associated with the future episode of the show, etc.

Server 140 may receive portal option selection 340, and may confirm that information associated with portal option selection 340 is available. As shown in FIG. 3, if server 140 determines that the information associated with portal option selection 340 is available, server 140 may provide information associated with the selected portal option (as shown by reference number 350) to STB 120 (e.g., for viewing on television 110 and/or storage via a DVR) and/or to user device 150 (e.g., for viewing and/or storage). Information 350 associated with the selected portal option may include, for example, a name of a future episode of a show, one or more show times associated with the future episode of the show, information associated with the future episode of the show, a preview associated with the future episode of the show, one or more recording options associated with the future episode of the show, related content associated with the future episode of the show, etc.

In one exemplary implementation, STB 120 and/or user device 150 may access future video content (e.g., future EPG data) that may include episode descriptions. When STB 120 and/or user device 150 detects the end of a show, STB 120 and/or user device 150 may retrieve the future episode information from the future EPG data, and may provide such information for display (e.g., with content portal 320).

Such an arrangement, as depicted in FIG. 3, may enable users to quickly access information associated with a favorite (or most-watched) show when an episode of the show ends (e.g., when curiosity about the show may be at a peak).

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300.

Figure 4:
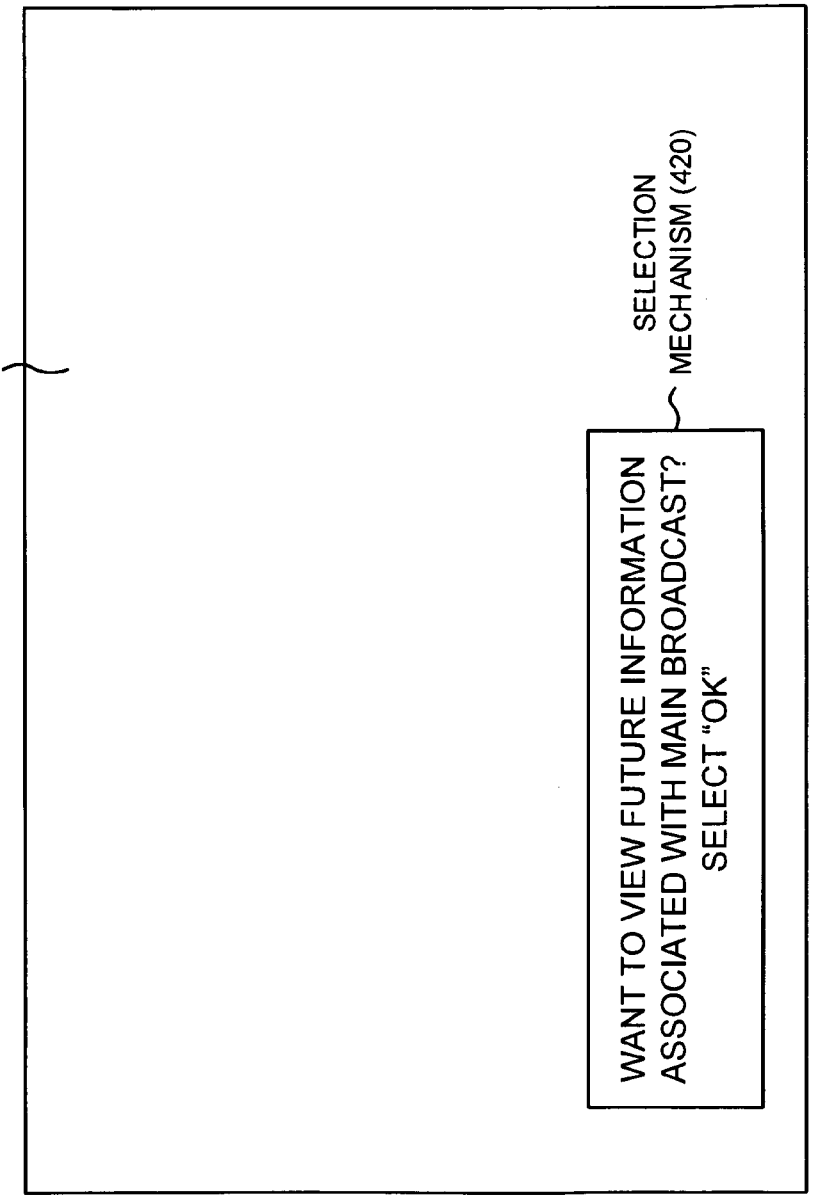
FIGS. 4-9 illustrate diagrams of exemplary user interfaces capable of being generated by the STB, the server, and/or the user device of the network depicted in FIG. 1.

FIG. 4 illustrates a diagram of an exemplary user interface 400 capable of being generated by STB 120, server 140, and/or user device 150 (e.g., and displayed via television 110 and/or user device 150). User interface 400, and each of the user interfaces depicted in FIGS. 5-9 and described below (collectively referred to as "the user interfaces"), may include a graphical user interface (GUI) or a non-graphical user interface, such as a text-based interface. The user interfaces may provide information to users via a customized interface (e.g., a proprietary interface) and/or other types of interfaces (e.g., a browser-based interface, a television interface, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

As illustrated in FIG. 4, user interface 400 may include a main broadcast 410, and/or a selection mechanism 420. Information associated with user interface 400 may be selected by a user of STB 120 (e.g., via remote control 130) and/or user device 150.

Main broadcast 410 may include a television program being broadcast via STB 120 on television 110 (or via user device 150), an episode of a television program, a television commercial, a program guide provided by STB 120 and/or user device 150, video-on-demand provided by STB 120 and/or user device 150, etc. In one exemplary implementation, main broadcast 410 may include a favorite (or a most-watched) show of a user associated with STB 120 and/or user device 150.

Selection mechanism 420 may include a button, an icon, a link, and/or other similar selection mechanisms (e.g., instructions) that provide an option to receive a content portal (e.g., content portal 320) associated with main broadcast 410. For example, selection mechanism 420 may include information, such as "Want to view future information associated with main broadcast? Select OK." In one implementation, server 140 may provide selection mechanism 420 to STB 120 and/or user device 150 when main broadcast 410 (e.g., an episode of a show) is complete or near completion (e.g., when final show credits are being shown). In other implementations, server 140 may provide selection mechanism 420 to STB 120 and/or user device 150 at any time. If a viewer of television 110 (and/or user device 150) selects selection mechanism 420 or follows instructions provided by selection mechanism 420 (e.g., via remote control 130), server 140 may provide content portal 320 to STB 120 and/or user device 150.

Although user interface 400 depicts a variety of information, in other implementations, user interface 400 may depict fewer, different, or additional information than depicted in FIG. 4. For example, although selection mechanism 420 is depicted as overlaying main broadcast 410, in some implementations, selection mechanism 420 may be provided in a side bar area on television 110.

Figure 5:
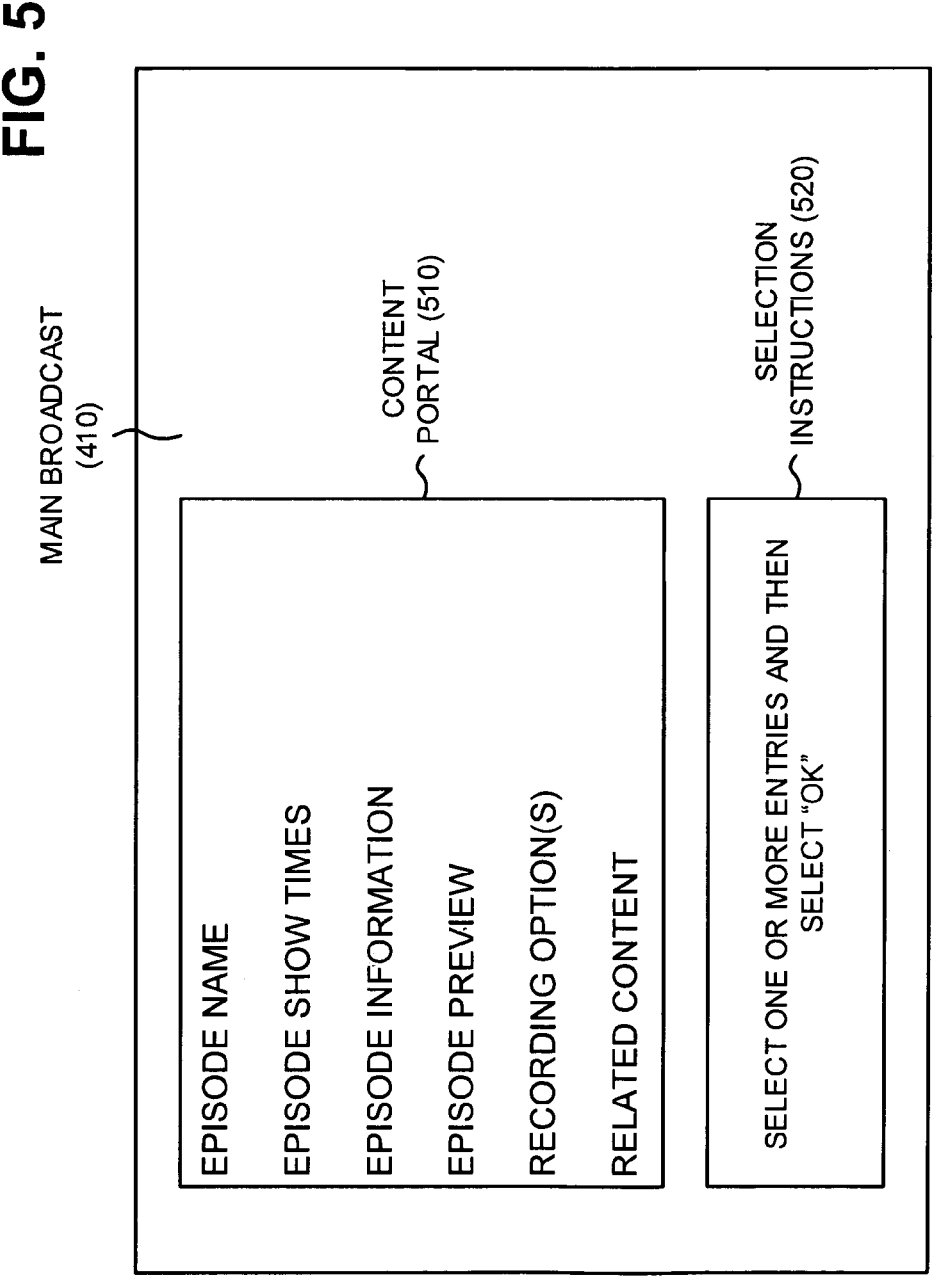

FIG. 5 depicts a diagram of an exemplary user interface 500 capable of being generated by STB 120, server 140, and/or user device 150 (e.g., and displayed via television 110 and/or user device 150). As illustrated, user interface 500 may include main broadcast 410, a content portal 510, and/or selection instructions 520. Information associated with user interface 500 may be selected by a user of STB 120 (e.g., via remote control 130) and/or user device 150. Main broadcast 410 may include the features described above in connection with, for example, FIG. 4.

Content portal 510 may include a content portal (e.g. content portal 320 and/or portal 330) associated with main broadcast 410. Content portal 510 include a variety of entries associated with main broadcast 410. For example, content portal 510 may include an entry for a name of a future episode (e.g., "Episode Name") associated with main broadcast 410 (e.g., a show), an entry for one or more show times (e.g., "Episode Show Times") associated with the future episode of the show, an entry for information (e.g., "Episode Information") associated with the future episode of the show, an entry for a preview (e.g., "Episode Preview") associated with the future episode of the show, an entry for one or more recording options (e.g., "Recording Option(s)") associated with the future episode of the show, and/or an entry for related content (e.g., "Related Content") associated with the future episode of the show. In other implementations, content portal 510 may include fewer, different, or additional entries than depicted in FIG. 5.

Selection instructions 520 may include a window, a menu, a drop-down menu, and/or other similar instruction presentation mechanisms that provide one or more instructions associated with content portal 510. For example, selection instructions 520 may provide one or more instructions for selecting one or more entries provided by content portal 510 (e.g., "Select one or more entries and then select 'OK'").

Although user interface 500 depicts a variety of information, in other implementations, user interface 500 may depict fewer, different, or additional information than depicted in FIG. 5. For example, although content portal 510 and selection instructions 520 are depicted separately, in some implementations, content portal 510 and selection instructions 520 may combined together. In still other implementations, content portal 510 and/or selection instructions 520 may not be associated with main broadcast 410 (e.g., they may be associated with another favorite or most-watched show), and may be provided separately from main broadcast 410.

Figure 6:
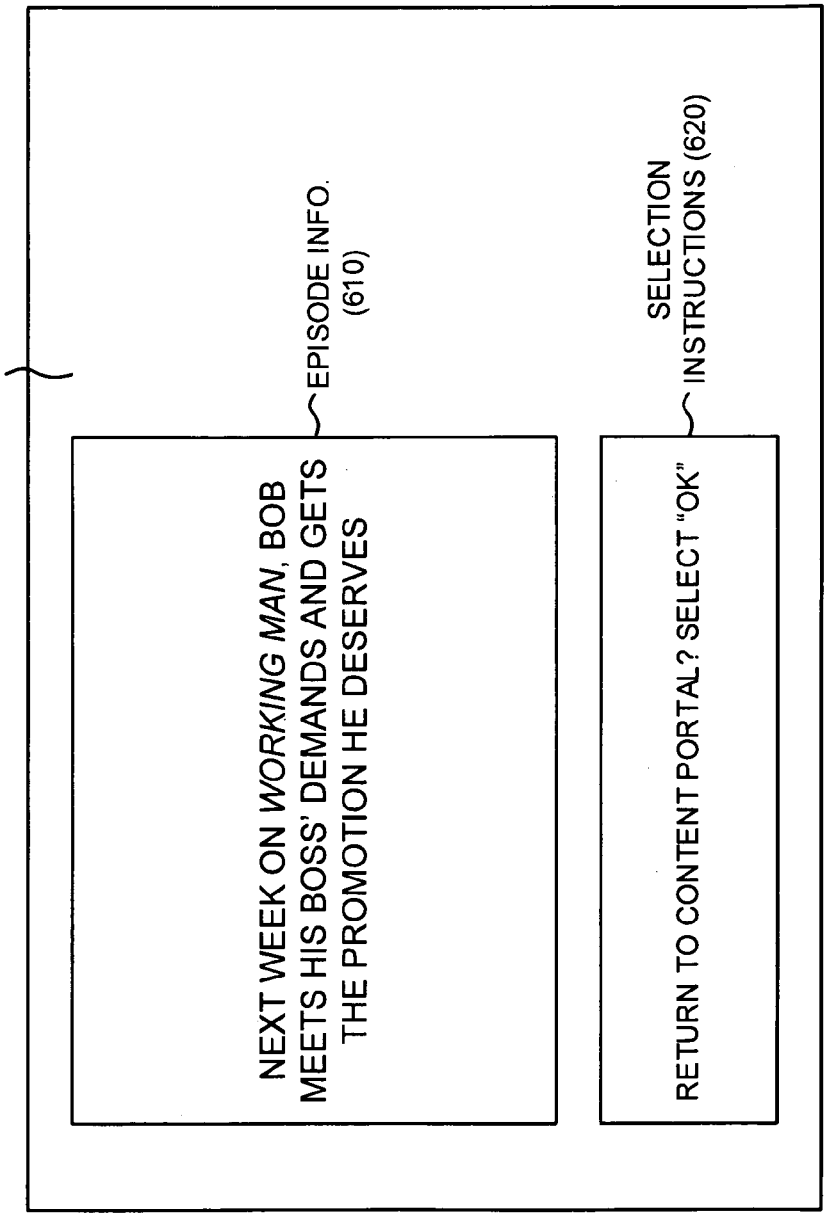

FIG. 6 depicts a diagram of an exemplary user interface 600 capable of being generated by STB 120, server 140, and/or user device 150 (e.g., and displayed via television 110 and/or user device 150). As illustrated, user interface 600 may include main broadcast 410, episode information 610, and/or selection instructions 620. Information associated with user interface 600 may be selected by a user of STB 120 (e.g., via remote control 130) and/or user device 150. Main broadcast 410 may include the features described above in connection with, for example, FIG. 4.

Episode information 610 may include a window, a menu, a drop-down menu, and/or other similar presentation mechanisms that provide information associated with a show (e.g., a future episode of a show) that may be a user's favorite show (or one of the user's favorite shows), the user's most-watched show (or one of the user's most-watched shows), etc. In one implementation, episode information 610 may include a description of the future episode of the show, a synopsis of the plot line associated with the future episode of the show, etc. For example, as shown in FIG. 6, episode information 610 may provide a plot line (e.g., "Next week on Working Man, Bob meets his boss' demands and gets the promotion he deserves.") of a future episode for a show entitled "Working Man." In some implementations, episode information 610 may include an indication of whether the future episode is a new episode or a re-run.

Selection instructions 620 may include a window, a menu, a drop-down menu, and/or other similar instruction presentation mechanisms that provide one or more instructions associated with content portal 510. For example, selection instructions 620 may provide one or more instructions for returning to the selections associated with content portal 510 (e.g., "Return to content portal? Select 'OK'").

Although user interface 600 depicts a variety of information, in other implementations, user interface 600 may depict fewer, different, or additional information than depicted in FIG. 6. For example, although episode information 610 and selection instructions 620 are depicted separately, in some implementations, episode information 610 and selection instructions 620 may be combined together. In other implementations, episode information 610 and/or selection instructions 620 may be provided and main broadcast 410 may be omitted.

Figure 7:
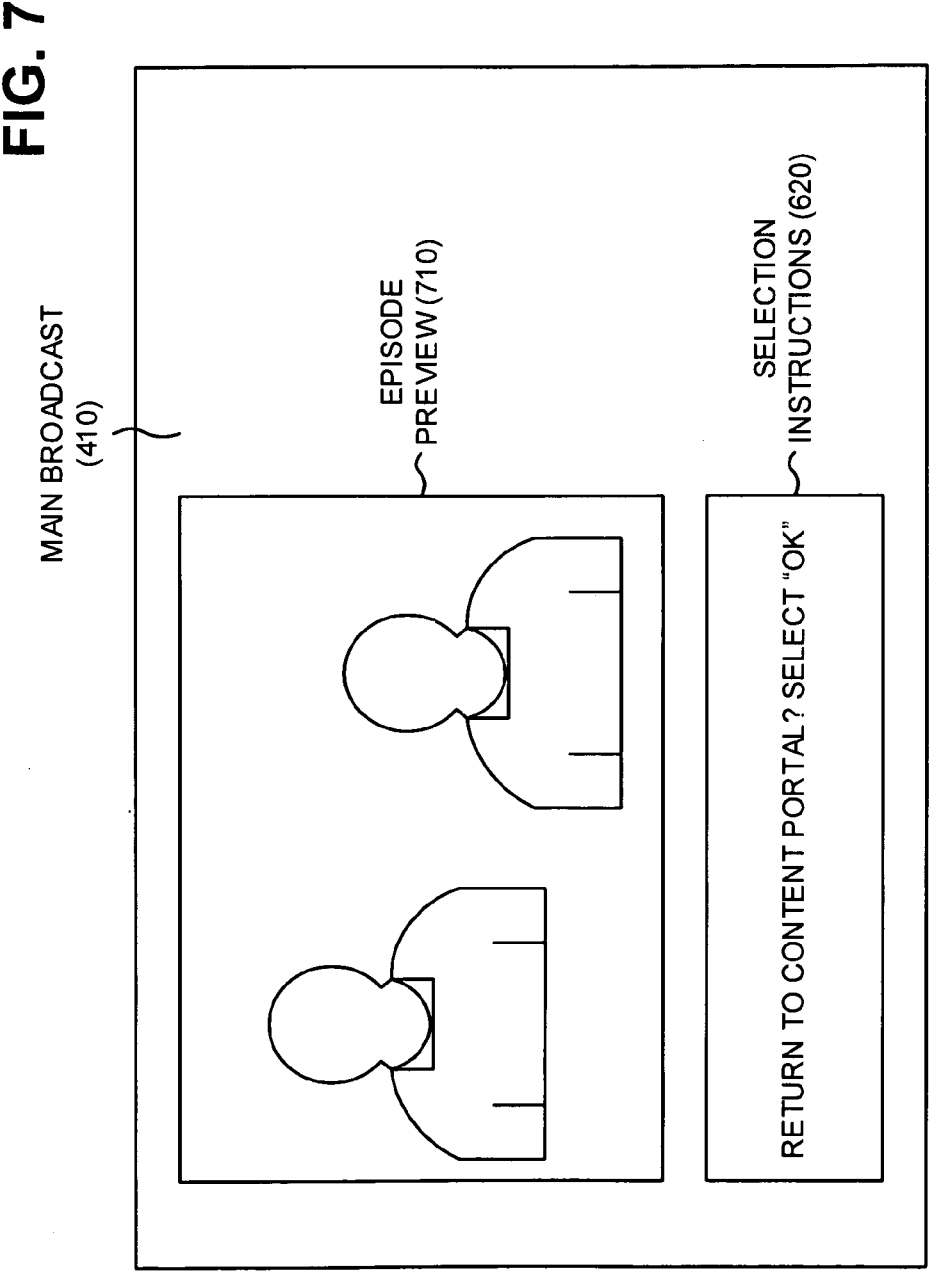

FIG. 7 depicts a diagram of an exemplary user interface 700 capable of being generated by STB 120, server 140, and/or user device 150 (e.g., and displayed via television 110 and/or user device 150). As illustrated, user interface 700 may include main broadcast 410, an episode preview 710, and/or selection instructions 620. Information associated with user interface 700 may be selected by a user of STB 120 (e.g., via remote control 130) and/or user device 150. Main broadcast 410 and selection instructions 620 may include the features described above in connection with, for example, FIGS. 4 and 6.

Episode preview 710 may include a window, a full screen, and/or other similar presentation mechanisms that provide video content (e.g., a preview, a video teaser, a trailer, etc.) associated with a show (e.g., a future episode of a show) that may be a user's favorite show (or one of the user's favorite shows), the user's most-watched show (or one of the user's most-watched shows), etc. In one implementation, as shown in FIG. 7, episode preview 710 may include a video that provides a preview of the future episode of the show.

Although user interface 700 depicts a variety of information, in other implementations, user interface 700 may depict fewer, different, or additional information than depicted in FIG. 7. For example, although episode preview 710 and selection instructions 620 are depicted separately, in some implementations, episode preview 710 and selection instructions 620 may be combined together. In other implementations, episode preview 710 and/or selection instructions 620 may be provided and main broadcast 410 may be omitted.

Figure 8:
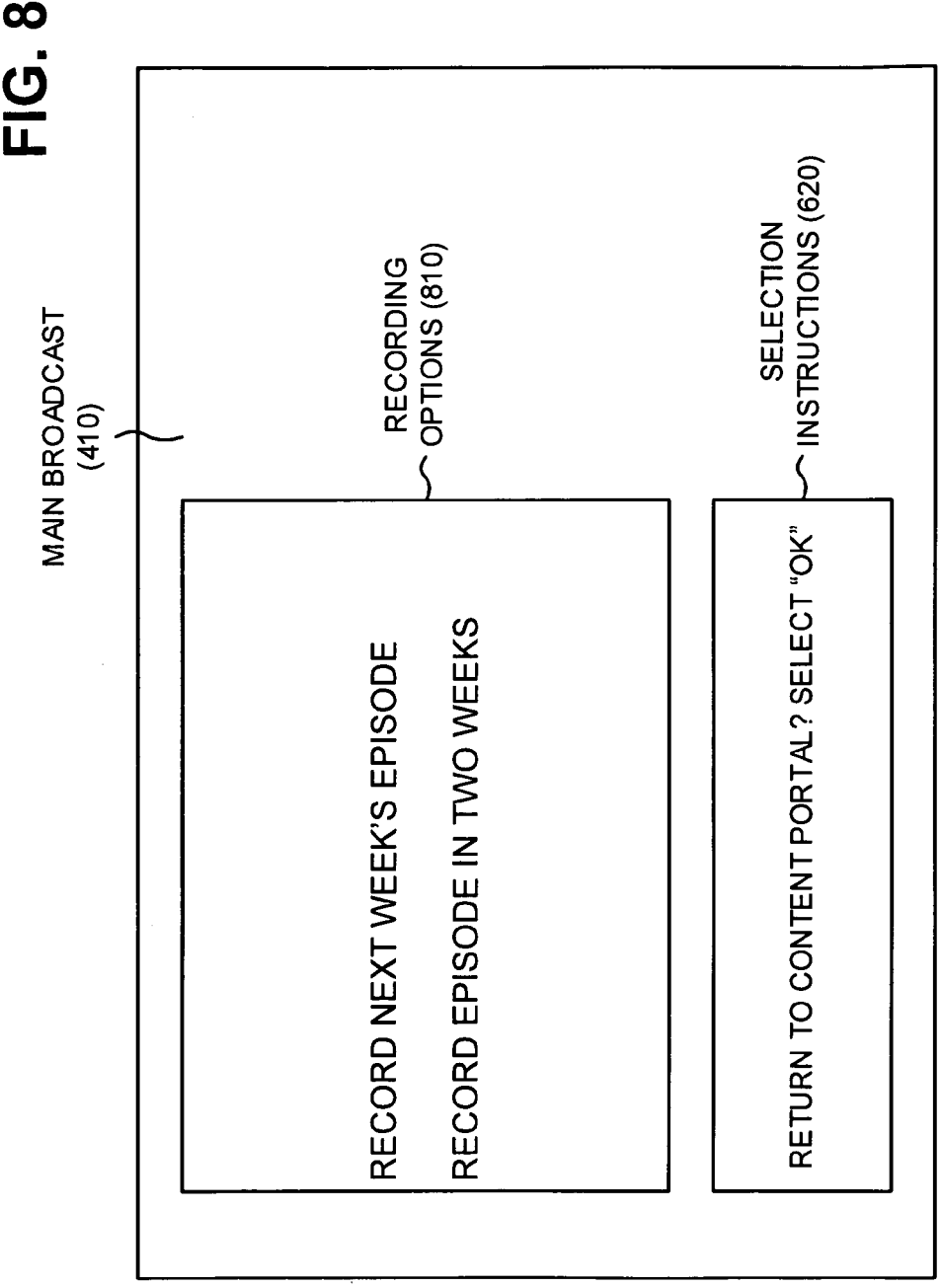

FIG. 8 depicts a diagram of an exemplary user interface 800 capable of being generated by STB 120, server 140, and/or user device 150 (e.g., and displayed via television 110 and/or user device 150). As illustrated, user interface 800 may include main broadcast 410, recording options 810, and/or selection instructions 620. Information associated with user interface 800 may be selected by a user of STB 120 (e.g., via remote control 130) and/or user device 150. Main broadcast 410 and selection instructions 620 may include the features described above in connection with, for example, FIGS. 4 and 6.

Recording options 810 may include a window, a menu, a drop-down menu, and/or other similar presentation mechanisms that provide one or more recording options (e.g., record a future episode) associated with a show (e.g., a future episode of a show) that may be a user's favorite show (or one of the user's favorite shows), the user's most-watched show (or one of the user's most-watched shows), etc. In one implementation, as shown in FIG. 8, recording options 810 may include a variety of options (e.g., "Record next week's episode," "Record episode in two weeks," etc.) for recording the future episode(s) of the show. For example, recording options 810 may provide times, dates, recording options, etc. for the future episode(s) of the show.

Although user interface 800 depicts a variety of information, in other implementations, user interface 800 may depict fewer, different, or additional information than depicted in FIG. 8. For example, although recording options 810 and selection instructions 620 are depicted separately, in some implementations, recording options 810 and selection instructions 620 may be combined together. In other implementations, recording options 810 and/or selection instructions 620 may be provided and main broadcast 410 may be omitted.

Figure 9:
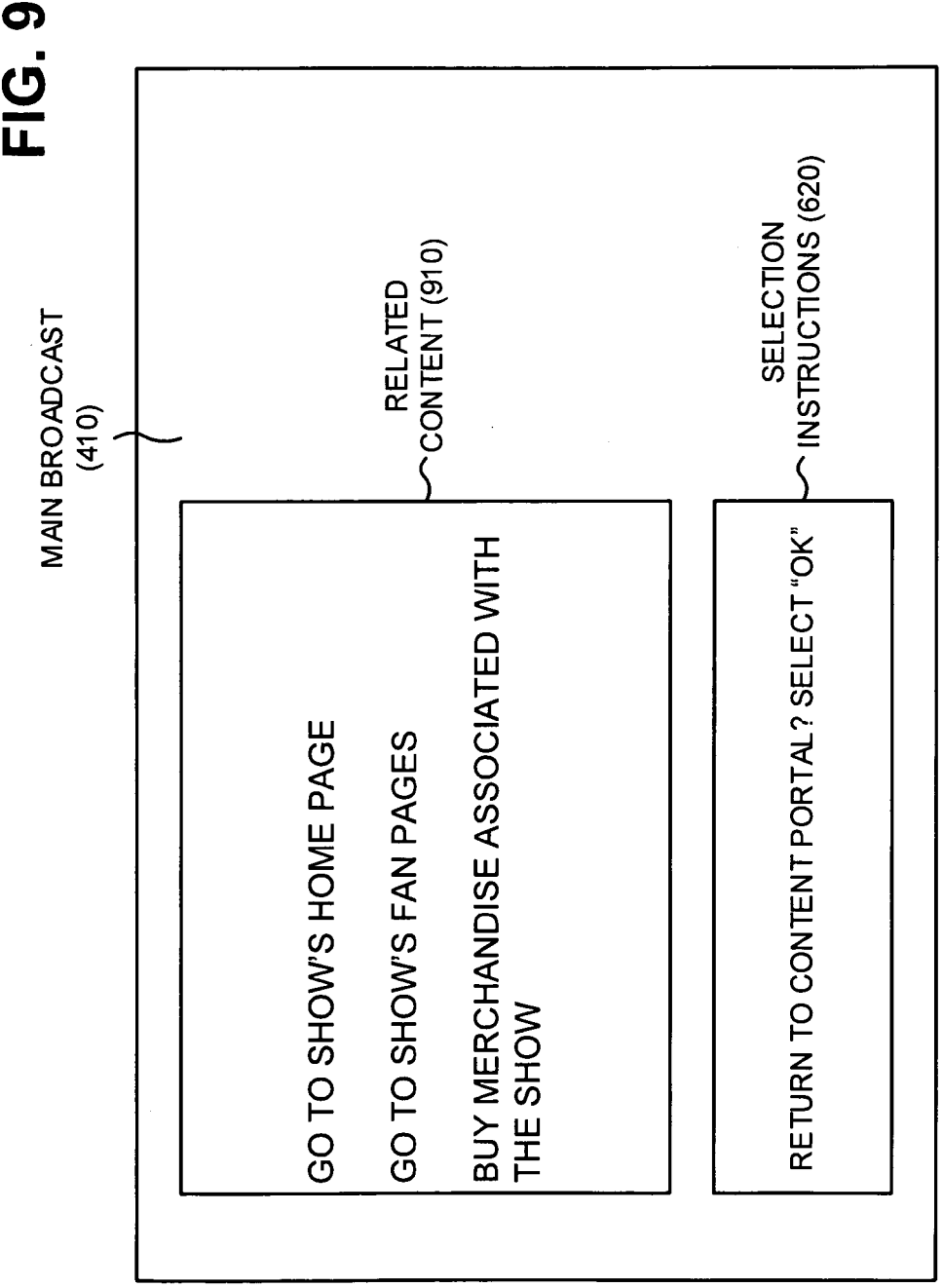

FIG. 9 depicts a diagram of an exemplary user interface 900 capable of being generated by STB 120, server 140, and/or user device 150 (e.g., and displayed via television 110 and/or user device 150). As illustrated, user interface 900 may include main broadcast 410, related content 910, and/or selection instructions 620. Information associated with user interface 900 may be selected by a user of STB 120 (e.g., via remote control 130) and/or user device 150. Main broadcast 410 and selection instructions 620 may include the features described above in connection with, for example, FIGS. 4 and 6.

Related content 910 may include a window, a menu, a drop-down menu, and/or other similar presentation mechanisms that provide content related to a show that may be a user's favorite show (or one of the user's favorite shows), the user's most-watched show (or one of the user's most-watched shows), etc. In one implementation, as shown in FIG. 9, related content 910 may include a variety of options (e.g., "Go to show's home page," "Go to show's fan pages," "Buy merchandise associated with the show," etc.) for obtaining related content associated with the show. For example, if the "Go to show's home page" option is selected (e.g., via remote control 130 and/or user device 150), server 140 may connect STB 120 and/or user device 150 to an Internet home page (e.g., a web site) associated with the show. If the "Go to show's fan pages" option is selected (e.g., via remote control 130 and/or user device 150), server 140 may connect STB 120 and/or user device 150 to Internet fan pages (e.g., web sites) associated with the show. If the "Buy merchandise associated with the show" option is selected (e.g., via remote control 130 and/or user device 150), server 140 may provide a list of merchandise associated with the show (e.g., prior seasons' episodes, clothing, posters, etc.) to STB 120 and/or user device 150 for display, and/or may connect STB 120 and/or user device 150 to an Internet web site(s) providing merchandise associated with the show.

Although user interface 900 depicts a variety of information, in other implementations, user interface 900 may depict fewer, different, or additional information than depicted in FIG. 8. For example, although related content 910 and selection instructions 620 are depicted separately, in some implementations, related content 910 and selection instructions 620 may be combined together. In other implementations, related content 910 and/or selection instructions 620 may be provided and main broadcast 410 may be omitted.

Figure 10:
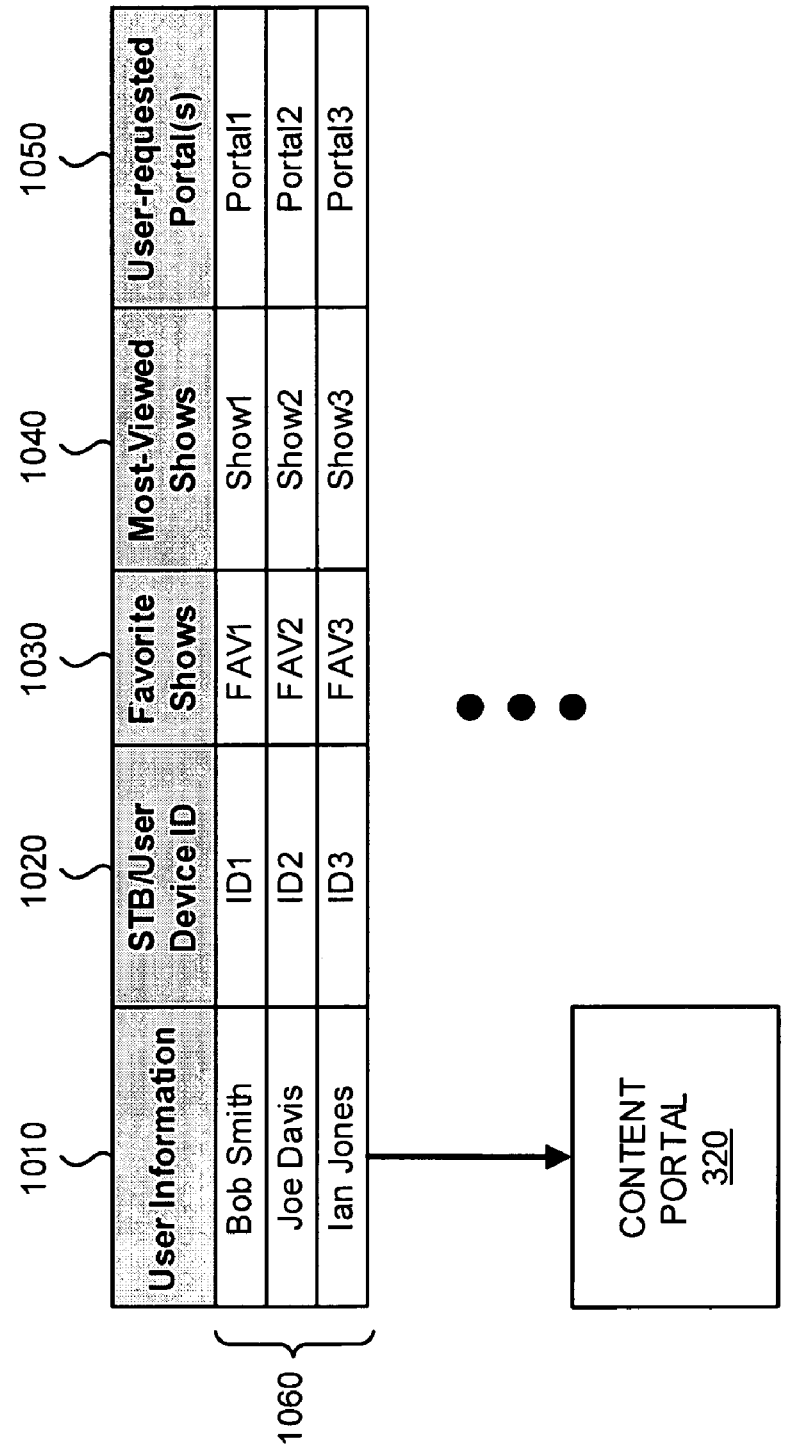
FIG. 10 illustrates a diagram of a portion of an exemplary database capable of being provided in and/or managed by the server of the network depicted in FIG. 1.

FIG. 10 illustrates a diagram of a portion 1000 of an exemplary database capable of being provided in and/or managed by server 140. As illustrated, database portion 1000 may include a variety of information associated with video content and/or users. For example, database portion 1000 may include a user information field 1010, a STB/user device identification (ID) field 1020, a favorite shows field 1030, a most-viewed shows field 1040, a user-requested portal(s) field 1050, and/or a variety of entries 1060 associated with fields 1010-1050.

User information field 1010 may include information associated with users (e.g., of content provided by server 140), such as user identification, user name, user address, user demographics, etc. For example, user information field 1010 may include entries for "Bob Smith," "Joe Davis," "Ian Jones," etc. In one example, each entry in user information field 1010 may include an identifier for a user (e.g., an account number, a password, etc.), the user's name, user contact information (e.g., address, telephone number, email address, etc.), etc.

STB/user device ID field 1020 may include entries 1060 that provide identification information for STBs and/or user devices associated with the users provided in user information field 1010. For example, STB/user device ID field 1020 may include entries 1060 for "ID1," "ID2," "ID3," etc. In one implementation, each of the IDs provided in STB/user device ID field 1020 may include identification information (e.g., numbers, letters, a combination of numbers and letters, etc.) associated with STBs and/or user devices to which video content is provided by server 140.

Favorite shows field 1030 may include entries 1060 that provide favorite shows (e.g., based on usage information 310) associated with the users provided in user information field 1010. For example, favorite shows field 1030 may indicate that a show (e.g., "FAV1") is the favorite show of "Bob Smith" (e.g., provided in user information field 1010), that a show (e.g., "FAV2") is the favorite show of "Joe Davis" (e.g., provided in user information field 1010), and that a show (e.g., "FAV3") is the favorite show of "Ian Jones" (e.g., provided in user information field 1010).

Most-viewed shows field 1040 may include entries 1060 that provide most-viewed shows (e.g., based on usage information 310) associated with the users provided in user information field 1010. For example, most-viewed shows field 1040 may indicate that a show (e.g., "Show1") is viewed the most by "Bob Smith" (e.g., provided in user information field 1010), that a show (e.g., "Show2") is viewed the most by "Joe Davis" (e.g., provided in user information field 1010), and that a show (e.g., "Show3") is viewed the most by "Ian Jones" (e.g., provided in user information field 1010).

User-requested portal(s) field 1050 may include entries 1060 that provide content portals requested by the users provided in user information field 1010. For example, user-requested portal(s) field 1050 may indicate that "Bob Smith" (e.g., provided in user information field 1010) requested a content portal (e.g., "Portal1"), that "Joe Davis" (e.g., provided in user information field 1010) requested a content portal (e.g., "Portal2"), and that "Ian Jones" (e.g., provided in user information field 1010) requested a content portal (e.g., "Portal2"). In one example, if a user (e.g., "Bob Smith") provided in user information field 1010 requests a content portal associated with "Monday Night Football," user-requested portal(s) field 1050 (e.g., corresponding to "Bob Smith") may include an entry for "Monday Night Football."

As further shown in FIG. 10, the information provided in database portion 1000 may be utilized (e.g., by server 140) to determine content portal 320 provided by server 140 to STB 120 and/or user device 150. For example, server 140 may determine that a content portal (e.g., "Portal1" provided in user-requested portal(s) field 1050) is appropriate for a particular user (e.g., "Bob Smith" provided in user information field 1010) based on the information provided in database portion 1000. Accordingly, server 140 may provide "Portal1," as content portal 320, to STB 120 and/or user device 150 associated with "Bob Smith."

Although FIG. 10 shows exemplary information that may be provided in database portion 1000, in other implementations, database portion 1000 may contain fewer, different, or additional information than depicted in FIG. 10.

Figure 11:
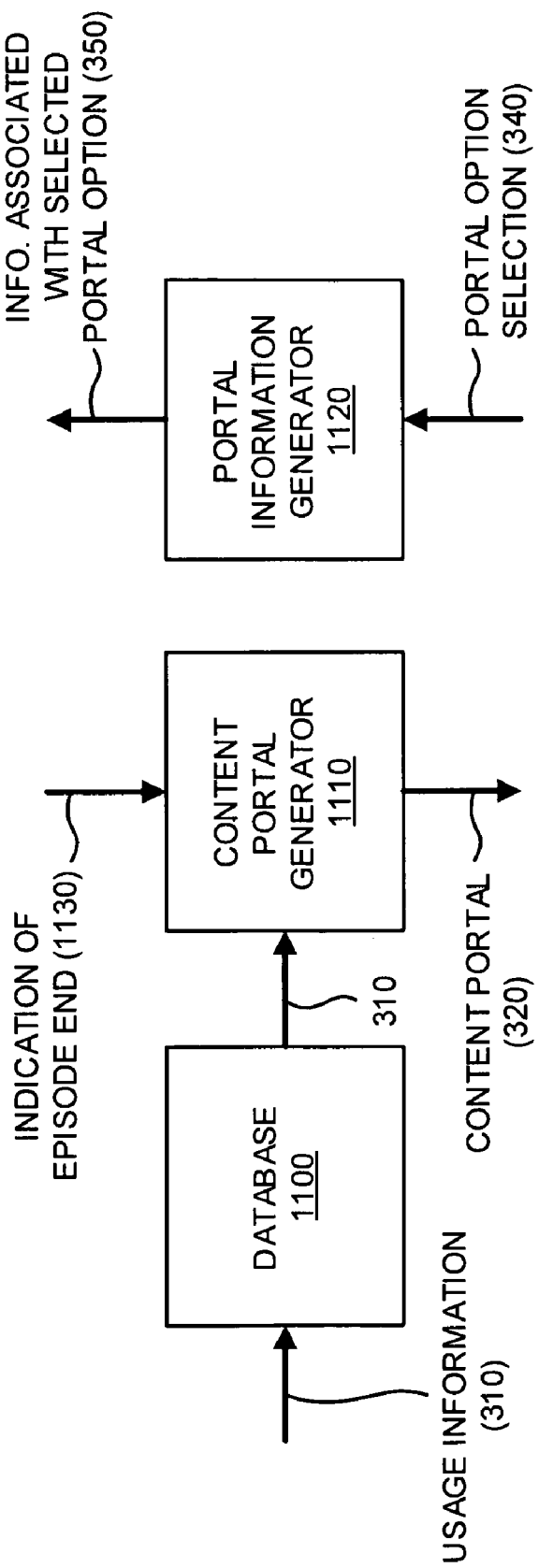
FIG. 11 depicts a diagram of exemplary functional components of the server of the network illustrated in FIG. 1.

FIG. 11 depicts a diagram of exemplary functional components of server 140. As illustrated, server 140 may include a database 1100, content portal generator logic 1110, and/or portal information generator logic 1120. The functions described in FIG. 11 may be performed by one or more of the exemplary components of device 200 depicted in FIG. 2.

Database 1100 may include a storage device (e.g., main memory 230, ROM 240, storage device 250, etc.) that may store information received by server 140. In one implementation, database 900 may store information described above in connection with database portion 1000 (FIG. 10). For example, as shown in FIG. 9, database 1100 may receive (e.g., from STB 120 and/or user device 150) and store usage information 310.

Content portal generator logic 1110 may include any hardware, software, or combination of hardware and software based logic (e.g., processing unit 220) that receives usage information 310 from database 900, and determines one or more content portals based on usage information 310. In one implementation, content portal generator logic 1110 may determine content portal 320 for a user's favorite show based on usage information 310 (e.g., based on a user-defined favorite show, based on a favorite show determined based on the user's viewing habits, etc.). In another implementation, content portal generator logic 1110 may determine content portal 320 for a user's most-watched show based on usage information 310 (e.g., based on a user-defined most-watched show, based on a most-watched show determined based on the user's viewing habits, etc.). As further shown in FIG. 11, content portal generator logic 1110 may receive an indication 1130 of an end of an episode (e.g., associated with the user's favorite or most-watched show), and may provide content portal 320 to STB 120 and/or user device 150 upon receiving indication 1130.

Portal information generator logic 1120 may include any hardware, software, or combination of hardware and software based logic (e.g., processing unit 220) that receives portal option selection 340 from STB 120 and/or user device 150, and confirms that information associated with portal option selection 340 is available. If portal information generator logic 1120 determines that the information associated with portal option selection 340 is available, portal information generator logic 1120 may provide information 350 associated with the selected portal option to STB 120 (e.g., for viewing on television 110 and/or storage via a DVR) and/or to user device 150 (e.g., for viewing and/or storage). Information 350 associated with the selected portal option may include, for example, a name of a future episode of a show, one or more show times associated with the future episode of the show, information associated with the future episode of the show, a preview associated with the future episode of the show, one or more recording options associated with the future episode of the show, related content associated with the future episode of the show, etc.

Although FIG. 11 shows exemplary functional components of server 140, in other implementations, server 140 may contain fewer, different, or additional functional components than depicted in FIG. 11. In still other implementations, one or more functional components of server 140 may perform one or more other tasks described as being performed by one or more other functional components of server 140.

Figure 12:
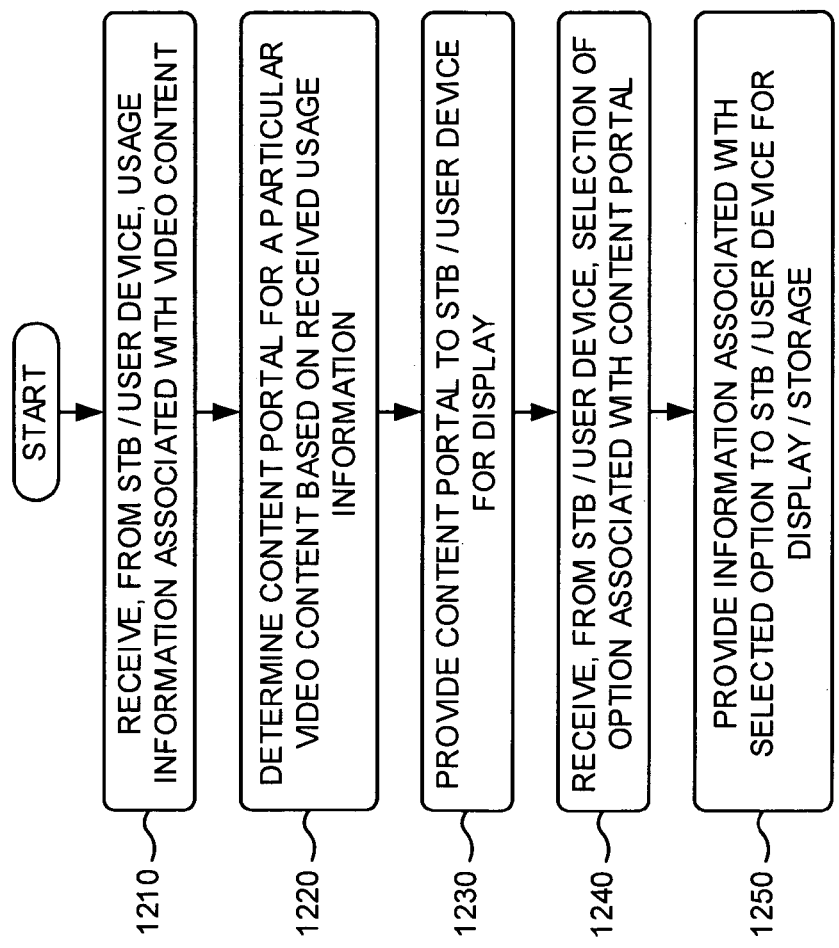
FIGS. 12-14 illustrate flow charts of an exemplary process according to implementations described herein.
Figure 13:
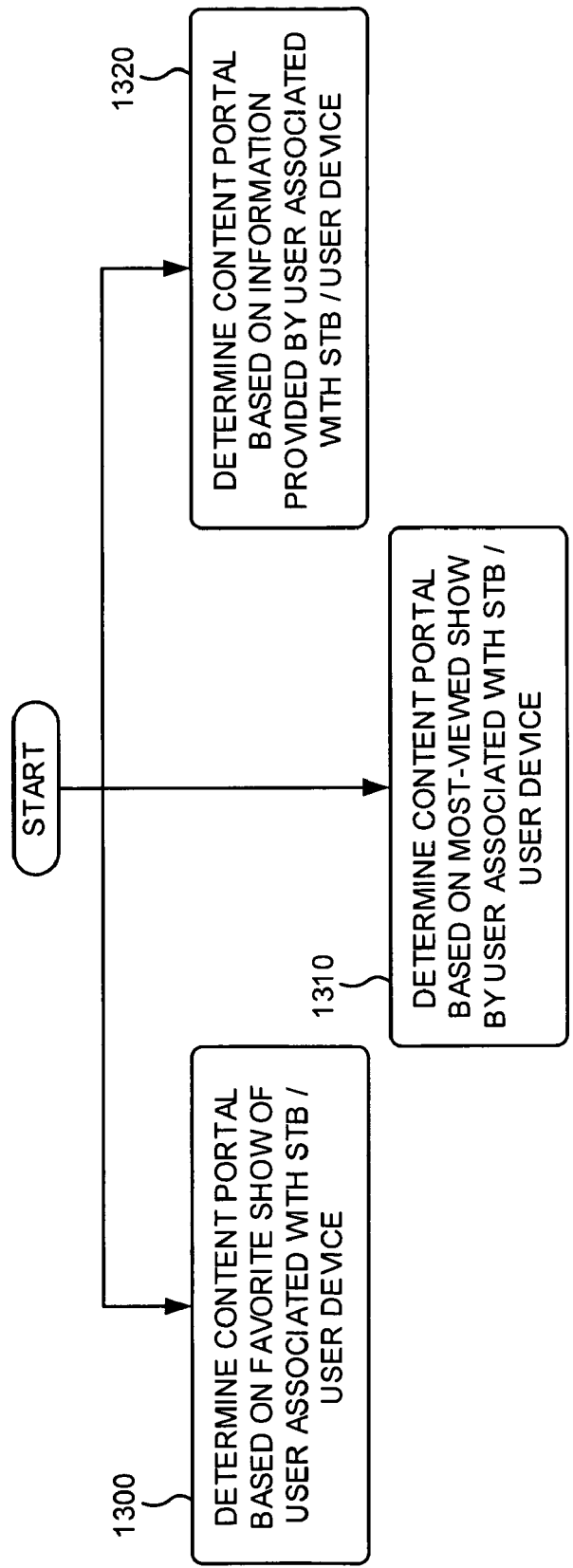
Figure 14:
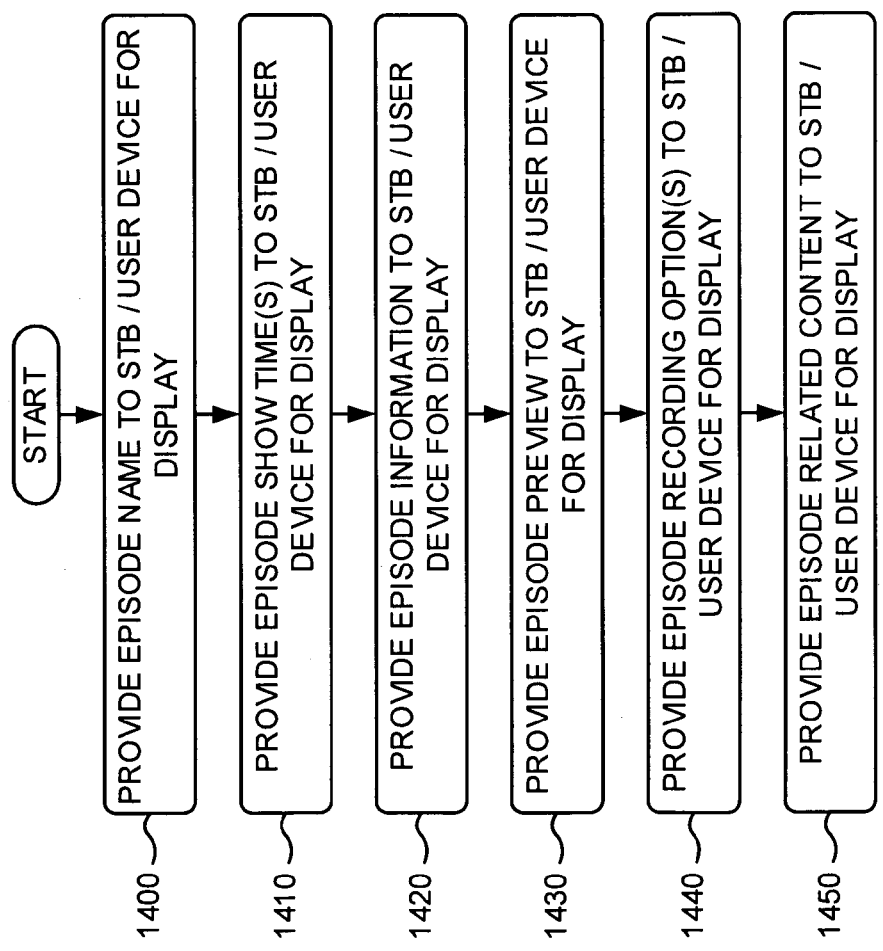

FIGS. 12-14 illustrate flow charts of an exemplary process 1200 for providing a content portal that includes information associated with an upcoming episode of a television show, according to implementations described herein. In one implementation, process 1200 may be performed by server 140. In another implementation, some or all of process 1200 may be performed by another device or group of devices, including or excluding server 140.

As illustrated in FIG. 12, process 1200 may begin with receipt, from a set-top box (STB) and/or a user device, of usage information associated with video content (block 1210). For example, in implementations described above in connection with FIG. 3, server 140 may receive (e.g., from STB 120 and/or user device 150) usage information 310. Usage information 310 may include information associated with usage of services (e.g., provided by server 140) by a user of STB 120 and/or user device 150. Usage information 310 may include a user's favorite television show(s), a user's most-watched television show(s), identification information (e.g., a serial number, an account number, etc.) associated with the user's STB 120 and/or user device 150, a user's name, user demographic information (e.g., race, age, income, disabilities, educational attainment, home ownership, employment status, location, etc.), user-requested content portal(s) (e.g., a user may request a content portal for one or more shows and/or categories of shows), etc.

As further shown in FIG. 12, a content portal for a particular video content may be determined (or identified) based on the received usage information (block 1220). For example, in implementations described above in connection with FIG. 3, server 140 may use usage information 310 to determine (or identify) content portal 320. In one example, server 140 may determine content portal 320 for a user's favorite show based on usage information 310 (e.g., based on a user-defined favorite show, based on a favorite show determined based on the user's viewing habits, etc.). Content portal 320 may provide information associated with a show (e.g., an episode of a show) that may be a user's favorite show (or one of the user's favorite shows), the user's most-watched show (or one of the user's most-watched shows), etc. In one example, content portal 320 may include a name of a future episode of the show, one or more show times associated with the future episode of the show, information (e.g., a description, a story line, a plot, etc.) associated with the future episode of the show, a preview (e.g., a video clip, a trailer, etc.) associated with the future episode of the show, one or more recording options associated with the future episode of the show, related content (e.g., an Internet home page, merchandise, etc.) associated with the future episode of the show, etc.

Returning to FIG. 12, the content portal may be provided to the STB and/or the user device for display (block 1230). For example, in implementations described above in connection with FIG. 3, server 140 may provide content portal 320 to STB 120 and/or user device 150 for display when an episode of a show (e.g., a user's favorite show, the user's most-watched show) is complete. In one example, server 140 may provide the user (e.g., associated with STB 120 and/or user device 150) with an option to receive content portal 320 when the episode of the show is complete. In another example, server 140 may provide content portal 320 (or an option to receive content portal 320) to STB 120 and/or user device 150 at any time. For example, server 140 may provide content portal 320 (or an option to receive content portal 320) to STB 120 and/or user device 150 when the user is viewing an electronic program guide (EPG), an interactive program guide (IPG), an electronic service guide (ESG), etc.

As also shown in FIG. 12, selection of an option associated with the content portal may be received from the STB and/or the user device (block 1240), and information associated with the selected option may be provided to the STB and/or the user device for display and/or storage (block 1250). For example, in implementations described above in connection with FIG. 3, if a user (or viewer) of television 110 selects one of the options associated with portal 330 (e.g., via remote control 130), STB 120 may provide portal option selection 340 to server 140. Alternatively and/or additionally, user device 150 may provide portal option selection 340 to server 140. Portal option selection 340 may include selection of one or more of a name of a future episode of a show, one or more show times associated with the future episode of the show, information associated with the future episode of the show, a preview associated with the future episode of the show, one or more recording options associated with the future episode of the show, related content associated with the future episode of the show, etc. Server 140 may receive portal option selection 340, and may provide information associated with the selected portal option (as shown by reference number 350) to STB 120 (e.g., for viewing on television 110 and/or storage via a DVR) and/or to user device 150 (e.g., for viewing and/or storage).

Process block 1220 may include the process blocks depicted in FIG. 13. As shown in FIG. 13, process block 1220 may include one or more of determining the content portal based on a favorite show of a user associated with the STB and/or the user device (block 1300), determining the content portal based on a most-viewed show by a user associated with the STB and/or the user device (block 1310), or determining the content portal based on information provided by a user associated with the STB and/or the user device (block 1320). For example, in implementations described above in connection with FIG. 3, server 140 may determine content portal 320 for a user's favorite show based on usage information 310 (e.g., based on a user-defined favorite show, based on a favorite show determined based on the user's viewing habits, etc.). Alternatively and/or additionally, server 140 may determine content portal 320 for a user's most-watched show based on usage information 310 (e.g., based on a user-defined most-watched show, based on a most-watched show determined based on the user's viewing habits, etc.). Alternatively and/or additionally, server 140 may determine content portal 320 to be a user-requested portal based on usage information 310 (e.g., a user may request a content portal for one or more shows and/or categories of shows).

Process block 1230 may include the process blocks depicted in FIG. 14. As shown in FIG. 14, process block 1230 may include one or more of providing an episode name to the STB and/or the user device for display (block 1400), providing one or more episode show times to the STB and/or the user device for display (block 1410), or providing episode information to the STB and/or the user device for display (block 1420). For example, in implementations described above in connection with FIG. 3, server 140 may provide content portal 320 to STB 120 and/or user device 150 for display (e.g., via television 110 and/or user device 150). Content portal 320 may provide information associated with a show (e.g., an episode of a show) that may be a user's favorite show (or one of the user's favorite shows), the user's most-watched show (or one of the user's most-watched shows), etc. In one example, content portal 320 may include a name of a future episode of the show, one or more show times associated with the future episode of the show, and/or information (e.g., a description, a story line, a plot, etc.) associated with the future episode of the show.

As further shown in FIG. 14, process block 1230 may also include one or more of providing an episode preview to the STB and/or the user device for display (block 1430), providing one or more episode recording options to the STB and/or the user device for display (block 1440), or providing episode related content to the STB and/or the user device for display (block 1450). For example, in implementations described above in connection with FIG. 3, content portal 320 may include a preview (e.g., a video clip, a trailer, etc.) associated with the future episode of the show, one or more recording options associated with the future episode of the show, and/or related content (e.g., an Internet home page, merchandise, etc.) associated with the future episode of the show.

Systems and/or methods described herein may provide a content portal that includes information associated with an upcoming episode of video content. The content portal may include, for example, an episode name, episode show time(s), episode information (e.g., plot details), an episode preview, recording option(s), related content (e.g., an Internet home page for the video content, merchandise associated with the video content, etc.), etc. In one implementation, for example, the systems and/or methods may receive, from a set-top box (STB) and/or a user device, usage information associated with video content, and may determine a content portal for a particular video content based on the received usage information. The systems and/or methods may provide the content portal to the STB and/or the user device for display, and may receive, from the STB and/or the user device, selection of an option associated with the content portal. The systems and/or methods may provide the information associated with the selected option to the STB and/or the user device for display and/or storage.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 12-14, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by the computing device and from one or more of a set-top box (STB) or a user device, usage information associated with video content;
   determining, by the computing device, a content portal for a particular video content based on the received usage information;
   providing for display, by the computing device and to the one or more of the STB or the user device, an episode associated with the particular video content;
   determining, by the computing device, that the episode, associated with the particular video content, being provided for display is finished;
   providing, by the computing device and to one or more of the STB or the user device, the content portal for display based on determining that the episode associated with the particular video content being provided for display is finished, the content portal including information associated with a future episode of the particular video content;

receiving, by the computing device and from one or more of the STB or the user device, selection of an option associated with the content portal; and providing for display, by the computing device, information associated with the selected option to one or more of the STB or the user device.

2. The computing device-implemented method of claim 1, further comprising:

providing the information associated with the selected option to one or more of the STB or the user device for storage.

3. The computing device-implemented method of claim 1, where the video content comprises television programming.

4. The computing device-implemented method of claim 1, where determining, by the computing device, a content portal for a particular video content comprises one or more of:

determining the content portal based on a favorite television program of a user associated with one or more of the STB or the user device;

determining the content portal based on a most-viewed television program by the user; or determining the content portal based on a user-defined content portal.

5. The computing device-implemented method of claim 1, where the computing device comprises a server.

6. The computing device-implemented method of claim 1, where providing, by the computing device and to one or more of the STB or the user device, the content portal for display comprises one or more of:

providing a name of the future episode to one or more of the STB or the user device for display;

providing the future episode show time to one or more of the STB or the user device for display;

providing plot details of the future episode to one or more of the STB or the user device for display;

providing a preview of the future episode to one or more of the STB or the user device for display;

providing a recording option of the future episode to one or more of the STB or the user device for display; or providing related content associated with the future episode to one or more of the STB or the user device for display.

7. The computing device-implemented method of claim 6, where the plot details of the future episode comprise one or more of:

a description associated with the future episode; or a story line associated with the future episode.

8. The computing device-implemented method of claim 6, where the preview of the future episode comprises one or more of:

a video clip associated with the future episode;

a trailer associated with the future episode; or scenes associated with the future episode.

9. The computing device-implemented method of claim 6, where the related content comprises one or more of:

a web site associated with the particular video content; or merchandise associated with the particular video content.

10. The computing device-implemented method of claim 1, where providing, by the computing device and to one or more of the STB or the user device, the content portal for display comprises:

providing, to one or more of the STB or the user device, an option to receive the content portal when the episode associated with the particular video content is finished.

11. The computing device-implemented method of claim 1, where the particular video content comprises one or more of:

a favorite television program of a user associated with one or more of the STB or the user device;

a most-viewed television program by the user; or a television program defined by the user.

12. The computing device-implemented method of claim 1, where the user device comprises one or more of:

a radiotelephone;

a personal communications system (PCS) terminal;

a personal digital assistant (PDA);

a laptop; or a personal computer.

13. A device, comprising:

a memory to store a plurality of instructions; and a processor to execute instructions in the memory to:

receive, from one or more of a set-top box (STB) or a user device, usage information associated with television programming, determine a content portal for a particular television program based on the received usage information, provide for display, to the one or more of the STB or the user device, an episode associated with the particular video content;

determine that the episode associated with the particular television program being provided for display is finished, provide, to one or more of the STB or the user device, the content portal for display based on determining that the episode associated with the particular television program being provided for display is finished, the content portal including information associated with a future episode of the particular television program, receive, from one or more of the STB or the user device, selection of an option associated with the content portal, and provide information associated with the selected option to one or more of the STB or the user device for display.

14. The device of claim 13, where the device comprises a server.

15. The device of claim 13, where the user device comprises one or more of:

a radiotelephone, a personal communications system (PCS) terminal, a personal digital assistant (PDA), a laptop, or a personal computer.

16. The device of claim 13, where the processor is further to execute instructions in the memory to:

provide the information associated with the selected option to one or more of the STB or the user device for storage.

17. The device of claim 13, where, when determining a content portal for a particular television program, the processor is further to execute instructions in the memory to one or more of:

determine the content portal based on a favorite television program of a user associated with one or more of the STB or the user device, determine the content portal based on a most-viewed television program by the user, or determine the content portal based on information provided by the user.

18. The device of claim 13, where, when providing, to one or more of the STB or the user device, the content portal for display, the processor is further to execute instructions in the memory to one or more of:
- provide a name of the future episode associated with the particular television program to one or more of the STB or the user device for display,
- provide the future episode show time to one or more of the STB or the user device for display,
- provide plot details of the future episode to one or more of the STB or the user device for display,
- provide a preview of the future episode to one or more of the STB or the user device for display,
- provide a recording option of the future episode to one or more of the STB or the user device for display, or
- provide related content associated with the future episode to one or more of the STB or the user device for display.

19. The device of claim 18, where the plot details of the future episode comprise one or more of:
- a description associated with the future episode, or
- a story line associated with the future episode.

20. The device of claim 18, where the preview of the future episode comprises one or more of:
- a video clip associated with the future episode,
- a trailer associated with the future episode, or
- scenes associated with the future episode.

21. The device of claim 18, where the related content comprises one or more of:
- a web site associated with the particular television program, or
- merchandise associated with the particular television program.

22. The device of claim 13, where, when providing, to one or more of the STB or the user device, the content portal for display, the processor is further to execute instructions in the memory to:
- provide, to one or more of the STB or the user device, an option to receive the content portal when the episode associated with the particular television program being provided for display is finished.

23. The device of claim 13, where the particular television program comprises one or more of:
- a favorite television program of a user associated with one or more of the STB or the user device,
- a most-viewed television program by the user, or
- a television program defined by the user.

24. A system, comprising:
a server to:
- receive, from a device, usage information associated with television programming,
- determine a content portal for a particular television program based on the received usage information,
- provide for display, to the device, an episode associated with the particular television program;
- determine that the episode associated with the particular television program being provided for display is finished,
- provide for display, to the device, the content portal based on determining that the episode associated with the particular television program being provided for display is finished, the content portal including information associated with a future episode of the particular television program,
- receive, from the device, selection of an option associated with the content portal, and
- provide, to the device, information associated with the selected option.

25. The system of claim 24, where the device comprises one of a set-top box (STB) or a user device.

* * * * *